US012761985B2

(12) United States Patent
Anjum et al.

(10) Patent No.: US 12,761,985 B2
(45) Date of Patent: Oct. 13, 2026

(54) SYSTEM AND METHOD CONFIGURED TO PERFORM POWERSHELL MONITORING OF COMMUNICATIONS TO A COMPUTER-BASED SYSTEM USING KEYWORDS

(71) Applicant: SAUDI ARABIAN OIL COMPANY, Dhahran (SA)

(72) Inventors: Sharjeel Anjum, Dhahran (SA); Abdulaziz I Makenzi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 427 days.

(21) Appl. No.: 18/604,191

(22) Filed: Mar. 13, 2024

(65) Prior Publication Data

US 2025/0291654 A1 Sep. 18, 2025

(51) Int. Cl.
*G06F 9/54* (2006.01)

(52) U.S. Cl.
CPC .............. *G06F 9/542* (2013.01); *G06F 9/546* (2013.01)

(58) Field of Classification Search
CPC ................................ G06F 9/542; G06F 9/546
See application file for complete search history.

(56) References Cited

PUBLICATIONS

Tajiri et al.; Detection of Malicious PowerShell Using Word-Level Language Models; National Defense Academy, Yokosuka, Japan; Sep. 2020; 18 pages.
Hendler et al.; Detecting Malicious PowerShell Commands using Deep Neural Networks | Proceedings of the 2018 on Asia Conference on Computer and Communications Security (acm.org); Apr. 14, 2018; 19 pages.
Mimura et al.; Static detection of malicious PowerShell based on word embeddings; Elsevier; Internet of Things 15 (2021) 100404; 13 pages.

*Primary Examiner* — Gregory A Kessler
(74) *Attorney, Agent, or Firm* — Leason Ellis LLP

(57) ABSTRACT

A system and method monitor a communication directed to a computer-based system. A memory stores predetermined keywords and predetermined scores each corresponding to a predetermined keyword. A communications monitoring module monitors data string corresponding to the communications and detects a first keyword in the data string. An event code generating module generates an event code corresponding to the data string. A management module detects the generated event code. A keyword matching module searches the predetermined keywords for the detected first keyword and matches the detected first keyword with the generated event code. A score generating module generates a determined score from the detected first keyword and from the predetermined scores. A message generating module compares the determined score with a predetermined threshold and generates a message based on the comparison. The output device outputs the message corresponding to the communication. The method implements the system.

15 Claims, 6 Drawing Sheets

| PowerShell String | Score |
|---|---|
| Invoke-Kerberoast | 10 |
| Invoke-Mimikatz | 10 |
| Invoke-ShareFinder | 10 |
| mimikatz | 10 |
| DownloadString | 9 |
| DumpCreds | 9 |
| Get-GPPPassword | 9 |
| Get-NetDomain | 9 |
| Get-NetDomainTrust | 9 |
| Get-NetForest | 9 |
| Get-NetForestDomain | 9 |
| Get-NetForestTrust | 9 |
| New-InMemoryModule | 9 |
| PowerView | 9 |
| System-Net-CredentialCache | 9 |
| invoke-webrequest | 8 |
| nET.WeBcLIeNT | 8 |
| Net.WebRequest | 8 |
| WebClient | 8 |
| webrequest | 8 |
| Downloadfile | 8 |

FIG. 4

| PowerShell String | Original Score | Modified Score |
|---|---|---|
| invoke-webrequest | 8 | 3 |
| nET.WeBcLIeNT | 8 | 3 |
| Net.WebRequest | 8 | 3 |
| WebClient | 8 | 3 |
| webrequest | 8 | 3 |
| Downloadfile | 8 | 3 |

FIG. 5

600 602 604 606 608

| EventCode | Alert Name | ComputerName | Message |
| --- | --- | --- | --- |
| 800 | PowerShell_Webclient | Computer1 | Pipeline execution details for command line:<br>$origininfo =<br>& {Set-StrictMode-Version1; $_.OriginInfo}<br><br>Context Information:<br>DetailSequence=1<br>DetailTotal=1<br><br>SeqeuenceNumber=21<br><br>UserId=UNKNOWN<br>HostName=ConsoleHost<br>HostVersion=5.1.19041.2673<br>HostId=$$$$$$$<br>HostApplication=powershell-noprofile-ExecutionPolicy Bypass ((New-Object System.Net.WebClient). OpenRead (https://www.microsoft.com)). CanRead<br><br>EngineVersion=5.1.19041.2673<br>RunspaceId=8b433671-c1ab,4d97-be48-37e0185518<br>PipelineID=2<br>ScriptName=<br>CommandLine= $origininfo= & {Set-StrictMode-Version 1; $_OriginInfo}<br><br>Details:<br>CommandInvocation(Set-StrictMode): "Set-StrictMode"<br>ParameterBinding(Set-StrictMode): name="Version"; value="1.0" |

FIG. 6

SYSTEM AND METHOD CONFIGURED TO PERFORM POWERSHELL MONITORING OF COMMUNICATIONS TO A COMPUTER-BASED SYSTEM USING KEYWORDS

FIELD OF THE DISCLOSURE

The present disclosure relates generally to monitoring communications with computer-based systems, and, more particularly, to a system and method configured to perform PowerShell monitoring of communications to a computer-based system using keywords.

BACKGROUND OF THE DISCLOSURE

The computing and network infrastructure of an organization constitutes multiple internal computing systems and devices accessed by users in the organization, such as employees, managers, and system administrators. Communications from outside the organization are often directed to specific internal computing systems and devices, with such communications providing data, computing parameters, and external commands for affecting or configuring such internal computing systems and devices. One example is a computer-based "cookie", which is placed on a device used to access a website. To maintain data security for the organization, communication monitoring systems, applications, or modules monitor such outside communications to prevent cyberattacks and malware infiltrating the computing and network infrastructure of the organization.

An example of a communication monitoring application is PowerShell, which is a WINDOWS-based application for monitoring such communications from outside or from within the organization. PowerShell performs logging and monitoring of events involving such communications. Unfortunately, some cyberattackers and malware are able to utilize the features and functionality of PowerShell for evasive, persistence, and stealth reasons. In addition, system administrators utilize PowerShell very heavily, such that monitoring communications into and within an organization becomes cumbersome and a drain in computing resources of the organization.

SUMMARY OF THE DISCLOSURE

According to an implementation consistent with the present disclosure, a system and method are configured to perform PowerShell monitoring of communications to a computer-based system using keywords to more effectively perform monitoring of the communications.

In an implementation, a monitoring system is configured to monitor a communication directed to a computer-based system. The monitoring system includes a hardware-based processor, a memory, an operating system, a set of modules, and an output device. The memory is configured to store instructions, to provide the instructions to the hardware-based processor, to store a plurality of predetermined keywords, and to store a plurality of predetermined scores, wherein each of the plurality of predetermined scores corresponds to a respective one of the plurality of predetermined keywords. The operating system includes a communications monitoring module and an event code generating module. The communications monitoring module is configured to monitor a data string associated with the communication, and to detect a first keyword in the data string. The event code generating module is configured to generate an event code corresponding to the data string.

The set of modules is configured to implement the instructions provided to the hardware-based processor. The set of modules includes a management module, a keyword matching module, a score generating module, and a message generating module. The management module is configured to detect the generated event code. The keyword matching module is configured to search the plurality of predetermined keywords in the memory for the detected first keyword, and to match the detected first keyword with the generated event code. The score generating module is configured to generate a determined score from the detected first keyword and from the plurality of predetermined scores. The message generating module is configured to compare the determined score with a predetermined threshold, and to generate a message based on the comparison. The output device is configured to output the message corresponding to the communication.

The communications monitoring module can be configured to operate a PowerShell application. The data string can include a computer-based command or a computer-based parameter. The management module can include a security information and event management (SIEM) module or a log management module. In the case that the determined score is greater than the predetermined threshold, the message generating module can generate the message including an alert, and the output device can prevent outputting the communication to the computer-based system. Alternatively, in the case that the determined score is less than or equal to the predetermined threshold, the output device can output the communication to the computer-based system. The message generating module can generate the message including an event message, and the management module can store the event message as a logged event in the memory.

In another implementation, a computer-based method is configured to monitor a communication directed to a computer-based system. The computer-based method comprises storing a plurality of predetermined keywords in a memory, and storing a plurality of predetermined scores, wherein each of the plurality of predetermined scores corresponds to a respective one of the plurality of predetermined keywords. The computer-based method also comprises receiving a data string corresponding to the communication, and detecting a keyword in the data string. The computer-based method further comprises generating an event code corresponding to the data string, matching the detected first keyword with the generated event code, generating a determined score from the detected first keyword and from the plurality of predetermined scores, comparing the determined score with a predetermined threshold, generating a message based on the comparison, and outputting the message corresponding to the communication.

Detecting the first keyword in the data string can include operating a PowerShell application. The data string can include a computer-based command or a computer-based parameter. Detecting the first keyword in the data string can include processing the data string using a security information and event management (SIEM) module or a log management module. The matching can include searching the plurality of predetermined keywords in the memory for the detected first keyword. In the case that the determined score is greater than the predetermined threshold, generating the message can include generating the message including an alert, and the computer-based method can further comprise preventing transmission of the communication to the computer-based system. Alternatively, in the case that the determined score is less than or equal to the predetermined threshold, generating the message can include generating the message including the data string, and outputting the message can include outputting the message to the computer-based system. Generating the message can include generating the message including a log event, outputting the message can include outputting the message to the memory, and the computer-based method can further comprise storing the message including the log event in the memory.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

BRIEF DESCRIPTION OF THE DRAWINGS

FIG. 4 are examples of PowerShell strings with assigned scores.

FIG. 5 are examples of modified scores for PowerShell strings.

FIG. 6 is an example of a message for an exact string match and alert details.

It is noted that the drawings are illustrative and are not necessarily to scale.

DETAILED DESCRIPTION OF CERTAIN EMBODIMENTS OF THE DISCLOSURE

Figure 1:
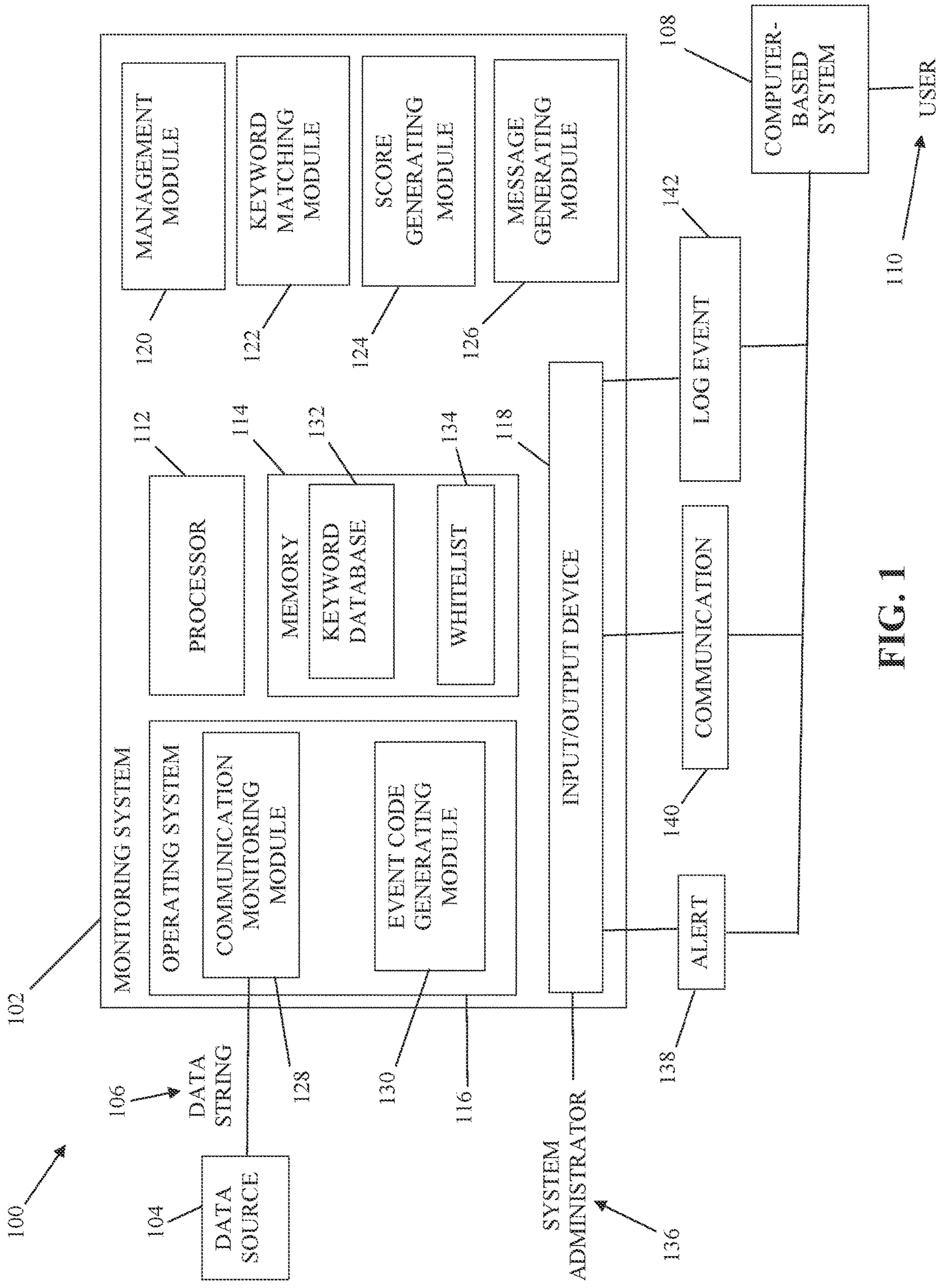
FIG. 1 is a schematic of a system, according to an implementation.

Example embodiments and implementations consistent with the teachings included in the present disclosure are directed to a system 100 and method 300 configured to perform PowerShell monitoring of communications to a computer-based system using keywords. Referring to FIG. 1, in one implementation consistent with the invention, the system 100 includes a monitoring system 102 operatively connected to a data source 104. In one implementation, the monitoring system 102 is operatively connected to a data source 104 through a network. For example, the network is the Internet. In another example, the network is an internal network or intranet of an organization. In a further example, the network is a heterogeneous or hybrid network including the Internet and the intranet.

The data source 104 is any device external to or internal to an organization with the data source 104 attempting to send a data string 106 as a communication to a computer-based system 108 of an individual or of the organization. In one implementation, the computer-based system 108 is a computing device operated by a user 110 as the individual. In another implementation, the computer-based system 108 is associated with the organization and operated by the user 110. In one implementation, the data string 106 is a command to operate, to configure, or to be processed by the computer-based system 108. In another implementation, the data string 106 is a parameter to be used to operate, to configure, or to be processed by the computer-based system 108. In a further implementation, the data string 106 is any known data to be used to operate, to configure, or to be processed by the computer-based system 108. In one implementation, the data string 106 includes a set of characters or symbols in a predetermined character set or a predetermined symbol set. For example, the data string 106 includes alphanumeric characters. In another example, the data string 106 includes alphanumeric characters and non-alphanumeric characters, such as "-", ".", "#", "@", and "&". A list of example data strings 106 is shown in FIGS. 4-5.

In one implementation, the monitoring system 102 includes a hardware-based processor 112, a memory 114, an operating system 116, an input/output device 118, and a set of modules 120-134. The memory 114 is configured to store instructions, to provide the instructions to the hardware-based processor 112, to store a plurality of predetermined keywords such as in a keyword database 132 as shown in FIG. 1, and to store a plurality of predetermined scores, weights, or weightages associated with data strings, as shown in FIGS. 4-5. Such scores are associated or calculated per user 110 or per computer-based system 108. A score associated with a data string facilitates identifying and monitoring commands, parameters, or other data per user or per computer-based system. In another implementation, as shown in FIG. 1, the memory 114 is configured to store a whitelist 134 of acceptable users and systems, as well as acceptable PowerShell strings for operational and administrative purposes, as described below.

In one implementation, each of the predetermined keywords includes a set of characters or symbols in a predetermined character set or a predetermined symbol set. For example, each of the predetermined keywords includes alphanumeric characters in the Latin alphabet set, such as "a", "A", "b", "B", etc., and the Arabic numeral set, such as "1", "2", etc. As shown in FIGS. 4-5, example keywords include "invoke", "Kerberoast", "mimikatz", "DownloadString", etc. Other example keywords include "Kerberoast1", "DownloadString5", etc. In another example, each of the predetermined keywords includes alphanumeric characters, such as "a", "A", "b", "B", etc., and the Arabic numeral set, such as "1", "2", etc., as well as non-alphanumeric characters, such as "-", ".", "#", "@", and "&". As shown in FIGS. 4-5, example keywords include "Invoke-Kerberoast", "Get-NetDomain", "Net. WebRequest", etc.

In one implementation, each of the predetermined scores is an integer value in a predetermined range of scores. For example, as shown in FIGS. 4-5, the predetermined scores are integers such as "8", "9", "10", etc. in the range from zero to ten. In another implementation, each of the predetermined scores is a real number value in a predetermined range of scores. For example, the predetermined range of scores is in the range from zero to ten. In one implementation, the predetermined range of scores is a default range of scores stored in the memory 114. For example, the predetermined scores are obtained by the monitoring system 102 from an external source of scores. In another implementation, the predetermined range of scores is set or modified in the memory 114 by a system administrator 136 inputting data as the predetermined range of scores using the input/output device 118. For example, a predetermined score is 3. In another example, a predetermined score is 8. In one implementation, the predetermined scores are stored in a score database in the memory 114. Accordingly, the predetermined scores are populated in the memory 114.

Each of the plurality of predetermined scores corresponds to a respective one of the plurality of predetermined keywords, as shown in FIG. 4. In one implementation, the predetermined keywords are default keywords stored in the keyword database 132 in the memory 114, for example, obtained by the monitoring system 102 from an external source of keywords. In another implementation, the predetermined keywords are set or modified in the keyword database 132 in the memory 114 by a system administrator 136 inputting data as the predetermined keywords using the input/output device 118. Accordingly, the keyword database 132 is populated with the predetermined keywords.

In one implementation, the predetermined keywords are associated with respective scores shown in FIGS. 4-5 using default keyword and score associations stored in the keyword database 132 in the memory 114, for example, obtained by the monitoring system 102 from an external source of keywords and score associations. In another implementation, the predetermined keywords and score associations shown in FIGS. 4-5 are set or modified in the keyword database 132 in the memory 114 by a system administrator 136 inputting data as the predetermined keywords and score associations using the input/output device 118. Accordingly, the keyword database 132 and corresponding keyword and score associations are populated with the predetermined keywords and score associations.

In one implementation, a system administrator uses PowerShell for operational or administrative purposes. To avoid erroneously generating alerts for such uses of PowerShell, the system administrator enters a list of predetermined PowerShell strings using the input/output device 118, to be stored in the whitelist 134 in the memory 114. For example, the message generating module 126 flags such predetermined whitelisted PowerShell strings to prevent generating false positive alerts 138. In another implementation, the message generating module 126 flags whitelisted users and systems to prevent generating false positive alerts 138 when communications are conducted with such whitelisted users and systems.

The operating system 116 includes a communications monitoring module 128 and an event generating module 130. In one implementation, the operating system 116 is a WINDOWS-based operating system. In another implementation, the operating system 116 is any known operating system. In another implementation, as shown in FIG. 5, each of the plurality of predetermined keywords corresponds to one of a plurality of predetermined original scores and to one of a plurality of modified scores, such as internal request scores, as described below.

The communications monitoring module 128 is configured, responsive to the data string 106 as the communication to the computer-based system 108, to monitor the data string 106, and to detect a first keyword in the data string 106. Keyword detection can be performed, for instance, by parsing the data string and referencing a keyword database or otherwise utilizing a keyword matching module 122, as described below. In one implementation, the communications monitoring module 128 is configured to execute a PowerShell application. Various features of the PowerShell application are enabled and used, such as module logging, script block logging, and transcription logging. In another implementation, the communication monitoring module 128 is configured to executed any known monitoring application, system, or process. The event code generating module 130 is configured to generate an event code corresponding to the data string 106. In one implementation, the event code generating module 130 is configured to execute a WINDOW-based application which generates predetermined event codes based on a received data string 106. In another implementation, the event code generating module 130 is any known application which generates predetermined event codes based on a received data string 106. For example, the event codes include "EventCode 800", "EventCode 4103", and "EventCode 4104", such as shown in FIG. 6. In particular, EventCode 800 is used to log and monitor deobfuscated PowerShell strings if obfuscated PowerShell scripts are executed. Accordingly, EventCode 800 is useful to prevent operation of malwares such as QBOT, Houdini, and Emotet which are known to run highly obfuscated PowerShell Scripts.

The set of modules 120-134 are configured to implement the instructions provided to the hardware-based processor 112. The set of modules 120-134 include a management module 120, a keyword matching module 122, a score generating module 124, a message generating module 126, the communication monitoring module 128, and the event generating module 130. The management module 120 is configured to detect or receive the generated event code output by the event generating module 130. In one implementation, the management module 120 includes a security information and event management (SIEM) module. In another implementation, the management module 120 includes a log management module. The keyword matching module 122 is configured to search the plurality of predetermined keywords in the memory 114 for the detected first keyword, and to match the detected first keyword with the generated event code. In one implementation, the match to the generated event code is an identical match. In another implementation, the match is the closest match of the detected first keyword to a subset of all generated event codes.

The score generating module 124 is configured to generate a determined score from the detected first keyword and from the plurality of predetermined scores. In one implementation, the determined score is an integer value in the predetermined range of score values, as described above. In another implementation, the determined score is a real number value in the predetermined range of scores, as described above. The message generating module 126 is configured to compare the determined score with a predetermined threshold, and to generate a message based on the comparison. In one implementation, the predetermined threshold is equal to a numerical value. For example, the predetermined threshold is an integer value. In another implementation, the predetermined threshold is a real number value. For example, the predetermined threshold is in the range from zero to ten. In one implementation, the predetermined threshold is a default threshold stored in the memory 114. In another implementation, the predetermined threshold is set or modified in the memory 114 by a system administrator 136 inputting data as the predetermined threshold using the input/output device 118. For example, a predetermined threshold is 3. In another example, a predetermined threshold is 7.

The input/output device 118 is configured to output the message corresponding to the communication to the computer-based system 108. As described below, in one implementation, in the case that the determined score is greater than the predetermined threshold, the message generating module 126 generates the message including an alert 138, and the input/output device 118 prevents outputting the data string 106 as the communication to the computer-based system 108. For example, the computer-based system 108 is a computing device with a display, monitor, or other output device configured to output the alert 138 to a security monitoring team member as the user 110 to review the alert 138.

FIG. 6 illustrates an example message 600 including an alert 138, in which an EventCode field 602 lists event code 800, and an Alert Name field 604 lists a name of the alert 138, such as "PowerShell_Webclient1" associated with the event code 800. The example message in FIG. 6 also includes a ComputerName field 606 which lists a computer name, such as "Computer1", which corresponds to a name associated with the computer-based system 108, such as a computing machine or other computing device associated with the user 110. The example message in FIG. 6 also includes a Message field 608 indicating various details associated with the alert 138.

In another implementation, in the case that the determined score is less than or equal to the predetermined threshold, the input/output device 118 outputs the data string 106 as the communication 140 to the computer-based system 108. In a further implementation, in the case that the determined score is less than or equal to the predetermined threshold, the message generating module 126 generates the message including an event message, and the management module 120 stores the event message 142 as a logged event 142 in the memory 114. In an additional implementation, the input/output device 118 outputs the log event 142 to the to the computer-based system 108.

Figure 2:
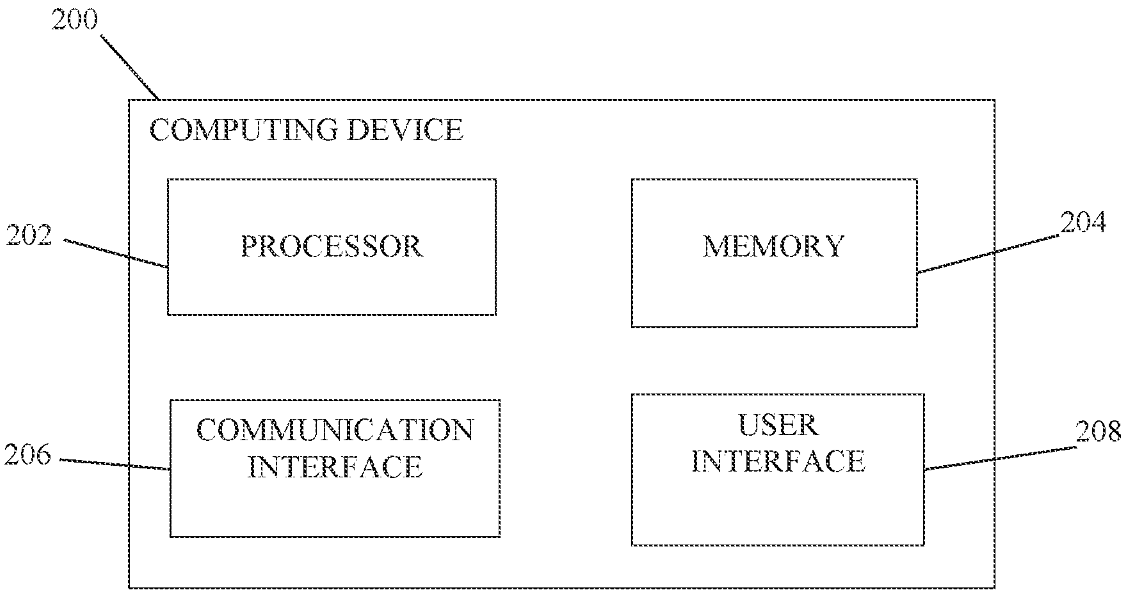
FIG. 2 is a schematic of a computing device used in the implementation.

FIG. 2 illustrates a schematic of a computing device 200 including a processor 202 having code therein, a memory 204, and a communication interface 206. Optionally, the computing device 200 can include a user interface 208, such as an input device, an output device, or an input/output device. The processor 202, the memory 204, the communication interface 206, and the user interface 208 are operatively connected to each other via any known connections, such as a system bus, a network, etc. Any component, combination of components, and modules of the system 100 in FIG. 1 can be implemented by a respective computing device 200. For example, each of the components shown in FIG. 1 can be implemented by a respective computing device 200 shown in FIG. 2 and described below.

It is to be understood that the computing device 200 can include different components. Alternatively, the computing device 200 can include additional components. In another alternative implementation, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can include one or more general-purpose processors. Alternatively, the processor 202 can include one or more special-purpose processors. The processor 202 can be integrated in whole or in part with the memory 204, the communication interface 206, and the user interface 208. In another alternative implementation, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative implementation, the processor 202 can include a plurality of nodes or artificial neurons configured as an artificial neural network. The processor 202 can be configured to implement any known artificial neural network, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative implementation, the instructions are executable by the processor 202 to cause the computing device 200 to execute an artificial neural network. The processor 202 can be implemented using hardware or software, such as the code. The processor 202 can implement a system, a sub-system, or a module, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. The user interface 208 can be configured to receive an input from a user. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

Figure 3A:
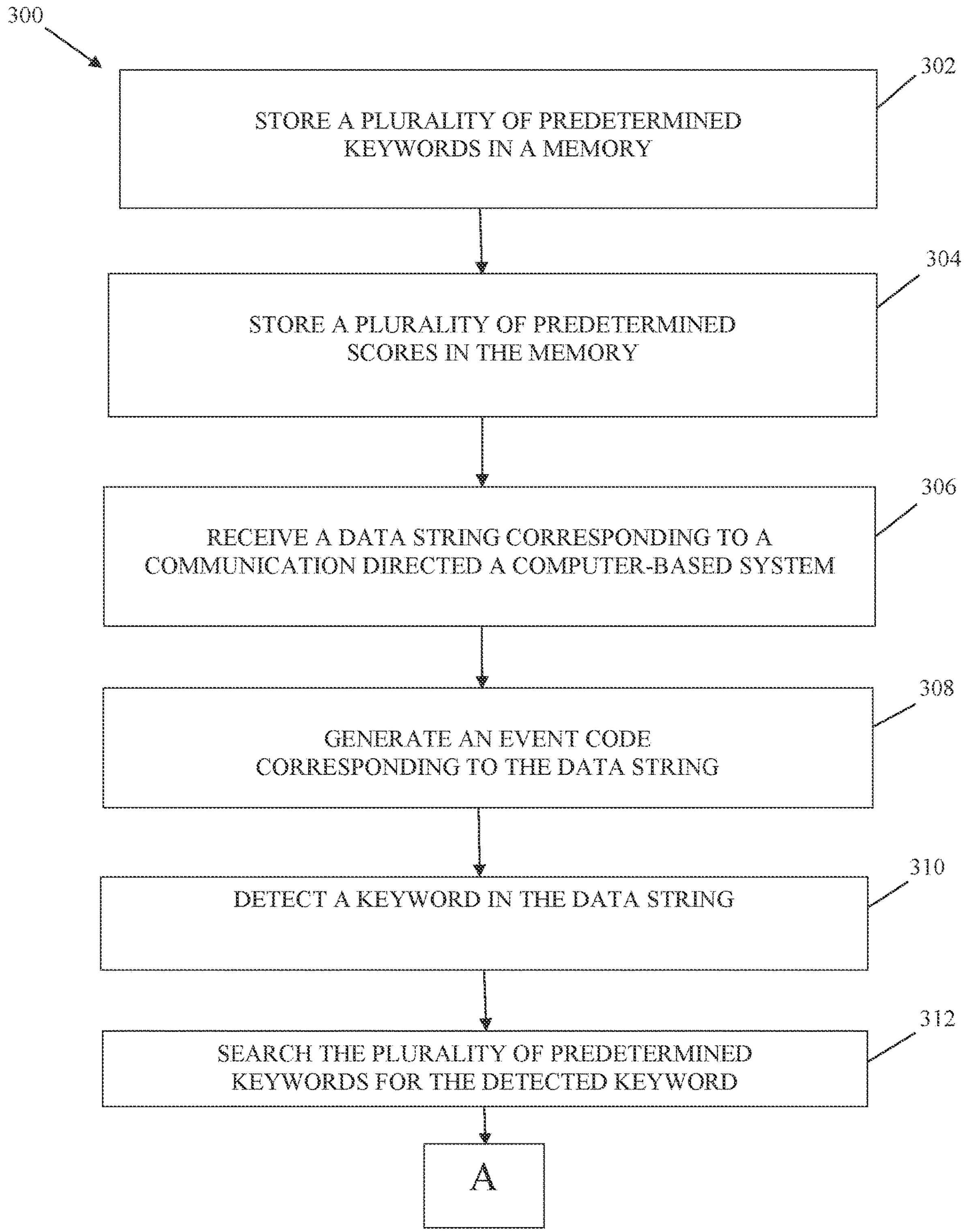
FIGS. 3A-3B are a flowchart of operation of the system of FIG. 1.
Figure 3B:
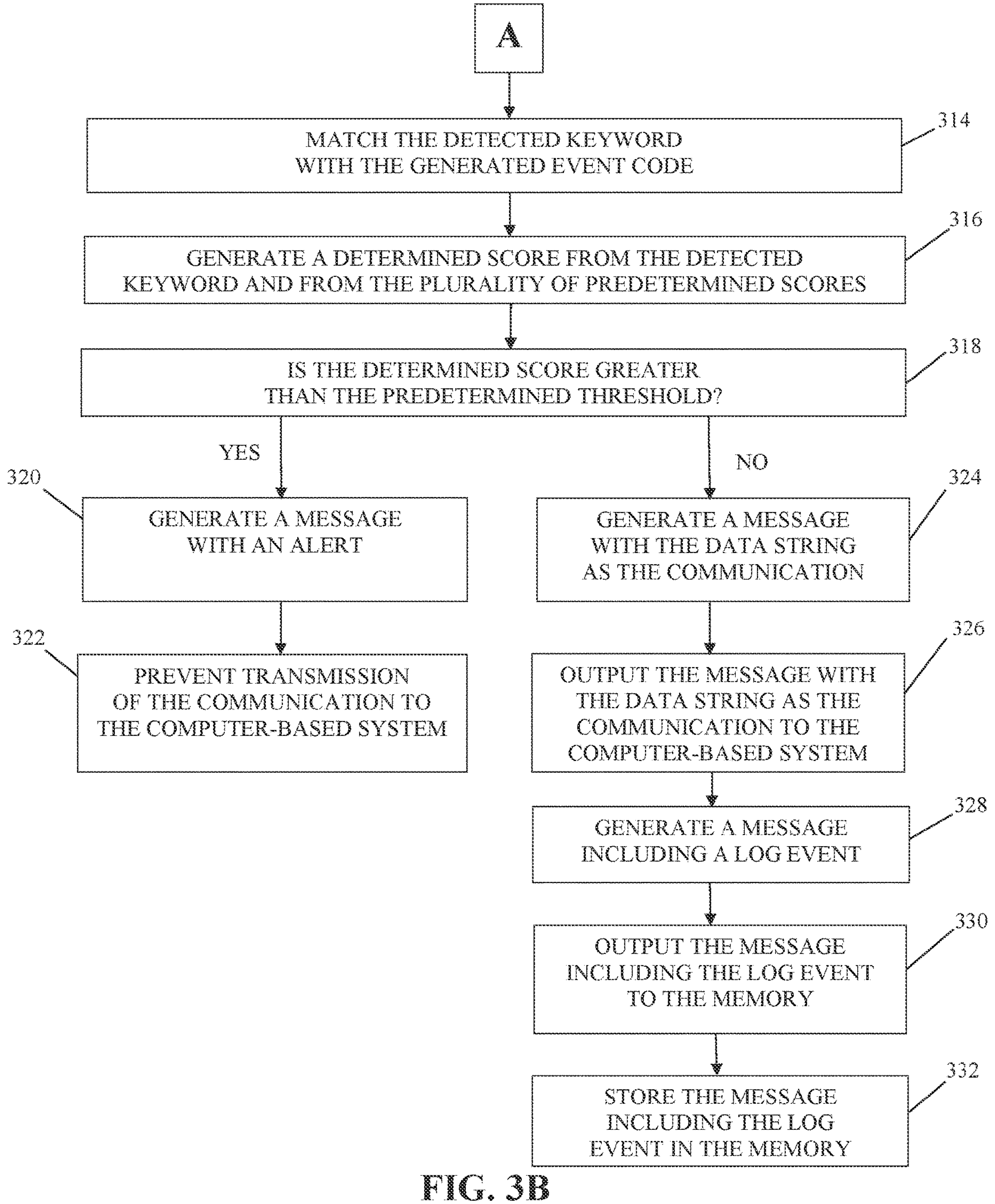

Referring to FIGS. 3A-3B, the method 300 includes the steps of storing a plurality of predetermined keywords in the memory 114 in step 302, and then storing a plurality of predetermined scores in the memory 114 in step 304, such that each of the plurality of predetermined scores corresponds to a respective one of the plurality of predetermined keywords. The method 300 then includes receiving the data string 106 corresponding to a communication directed to the computer-based system 108 in step 306, and then generating an event code corresponding to the data string 106 in step 308. The method 300 then includes detecting a keyword in the data string 106 in step 310, The method 300 then includes searching the plurality of predetermined keywords in the memory for the detected keyword in step 312. The method 300 then includes matching the detected keyword with the generated event code in step 314.

The method 300 then includes generating a determined score from the detected keyword and from the plurality of predetermined scores in step 316. In one implementation, the determined score is generated in step 316 by consulting the saved scores shown in FIG. 4. In another implementation, the determined score is generated in step 316 by consulting the modified scores as shown in FIG. 5. The modified scores are determined by the score generating module 124 by reducing the original scores for select PowerShell strings. For example, the modified scores are determined by a predetermined equation or algorithm, such as subtracting a predetermined numerical value, such as "5", from the original score. In another example, a system administrator uses the input/output device 118 to enter the modified scores in a score database in the memory 114.

In one implementation, a select PowerShell string is a data string 106 from an internal system of the organization as the data source 104. In another implementation, a select PowerShell string is a data string 106 from a known and acceptable domain, such as MICROSOFT.COM or other predetermined acceptable domains.

The method 300 then includes comparing the determined score with a predetermined threshold in step 318 to determine whether the determined score is greater than the predetermined threshold. In the case that the determined score is greater than the predetermined threshold in step 318, the method 300 includes generating, in step 320, a message 600 with an alert 138 as shown in FIG. 6, and preventing transmission of the communication 140 to the computer-based system 108 in step 322. Alternatively, in the case that the determined score is less than or equal to the predetermined threshold in step 318, the method 300 includes generating a message with the data string 106 as the communication 140 in step 324, and outputting the message with the data string 106 as the communication 140 to the computer-based system 108 in step 326. Optionally, the method 300 then includes generating a message including a log event 142 in step 328, outputting the message including the log event 142 to the memory 114 in step 330, and storing the message including the log event 142 in the memory 114 in step 332.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention not be limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A monitoring system configured to monitor a communication directed to a computer-based system, comprising:

a hardware-based processor;

a memory configured to store instructions, to provide the instructions to the hardware-based processor, to store a plurality of predetermined keywords, and to store a plurality of predetermined scores, wherein each of the plurality of predetermined scores corresponds to a respective one of the plurality of predetermined keywords;

an operating system including:

a communications monitoring module configured, responsive to a data string corresponding to the communication, to monitor the data string, and to detect a first keyword in the data string; and an event code generating module configured to generate an event code corresponding to the data string;

a set of modules configured to implement the instructions provided to the hardware-based processor, the set of modules including:

a management module configured to detect the generated event code;

a keyword matching module configured to search the plurality of predetermined keywords in the memory for the detected first keyword, and to match the detected first keyword with the generated event code;

a score generating module configured to generate a determined score from the detected first keyword and from the plurality of predetermined scores; and a message generating module configured to compare the determined score with a predetermined threshold, and to generate a message based on the comparison; and an output device configured to output the message corresponding to the communication.

2. The monitoring system of claim 1, wherein the communications monitoring module is configured to operate a PowerShell application.

3. The monitoring system of claim 1, wherein the data string includes a computer-based command or a computer-based parameter.

4. The monitoring system of claim 1, wherein the management module includes a security information and event management (SIEM) module or a log management module.

5. The monitoring system of claim 1, wherein, in the case that the determined score is greater than the predetermined threshold, the message generating module generates the message including an alert, and wherein the output device prevents outputting the communication to the computer-based system.

6. The monitoring system of claim 1, wherein, in the case that the determined score is less than or equal to the predetermined threshold, the output device outputs the communication to the computer-based system.

7. The monitoring system of claim 6, wherein the message generating module generates the message including an event message, and wherein the management module stores the event message as a logged event in the memory.

8. A computer-based method configured to monitor a communication directed to a computer-based system, comprising:

storing a plurality of predetermined keywords in a memory;

storing a plurality of predetermined scores, wherein each of the plurality of predetermined scores corresponds to a respective one of the plurality of predetermined keywords;

receiving a data string corresponding to the communication;

detecting a first keyword in the data string;

generating an event code corresponding to the data string;

matching the detected first keyword with the generated event code;

generating a determined score from the detected first keyword and from the plurality of predetermined scores;

comparing the determined score with a predetermined threshold;

generating a message based on the comparison; and outputting the message corresponding to the communication.

9. The computer-based method of claim 8, wherein detecting the first keyword in the data string includes operating a PowerShell application.

10. The computer-based method of claim 8, wherein the data string includes a computer-based command or a computer-based parameter.

11. The computer-based method of claim 8, wherein detecting the first keyword in the data string includes processing the data string using a security information and event management (SIEM) module or a log management module.

12. The computer-based method of claim 8, wherein the matching includes searching the plurality of predetermined keywords in the memory for the detected first keyword.

13. The computer-based method of claim 8, wherein, in the case that the determined score is greater than the predetermined threshold, generating the message includes generating the message including an alert, and wherein the computer-based method further comprises:

preventing transmission of the communication to the computer-based system.

14. The computer-based method of claim 8, wherein, in the case that the determined score is less than or equal to the predetermined threshold, generating the message includes generating the message including the data string, and wherein outputting the message includes outputting the message to the computer-based system.

15. The computer-based method of claim 14, wherein generating the message includes generating the message including a log event, wherein outputting the message includes outputting the message to the memory, and wherein the computer-based method further comprises storing the message including the log event in the memory.

* * * * *